J. J. SEVERIN.
RESILIENT WHEEL.
APPLICATION FILED MAY 2, 1914.

1,133,323.  Patented Mar. 30, 1915.

Witnesses
Robert M. Sutphen
A. L. Hind

Inventor
J. J. Severin
By Watson E. Coleman
Attorney

UNITED STATES PATENT OFFICE.

JOHN J. SEVERIN, OF BARNESBORO, PENNSYLVANIA.

RESILIENT WHEEL.

1,133,323.  Specification of Letters Patent.  Patented Mar. 30, 1915.

Application filed May 2, 1914. Serial No. 836,011.

*To all whom it may concern:*

Be it known that I, JOHN J. SEVERIN, a citizen of the United States, residing at Barnesboro, in the county of Cambria and State of Pennsylvania, have invented certain new and useful Improvements in Resilient Wheels, of which the following is a specification, reference being had to the accompanying drawings.

This invention relates to improvements in vehicle wheels, and more particularly to that class of wheels which are resilient.

An object of this invention is the provision of a resilient wheel, the wheel including a plurality of spring spokes disposed between the hub and the rim, each of the spokes comprising a pair of telescoping sections.

A further object of this invention is the provision of a spring wheel including a hub and a rim between which spring spokes are interposed, each of the spokes including a pair of telescoping sections, the outer section of each spoke which is secured to the rim being capable of slight circumferential movement with relation to the inner sections of the spokes to prevent undue strain from being imposed upon the horizontally positioned spokes when the wheel is revolving.

Figure 1:
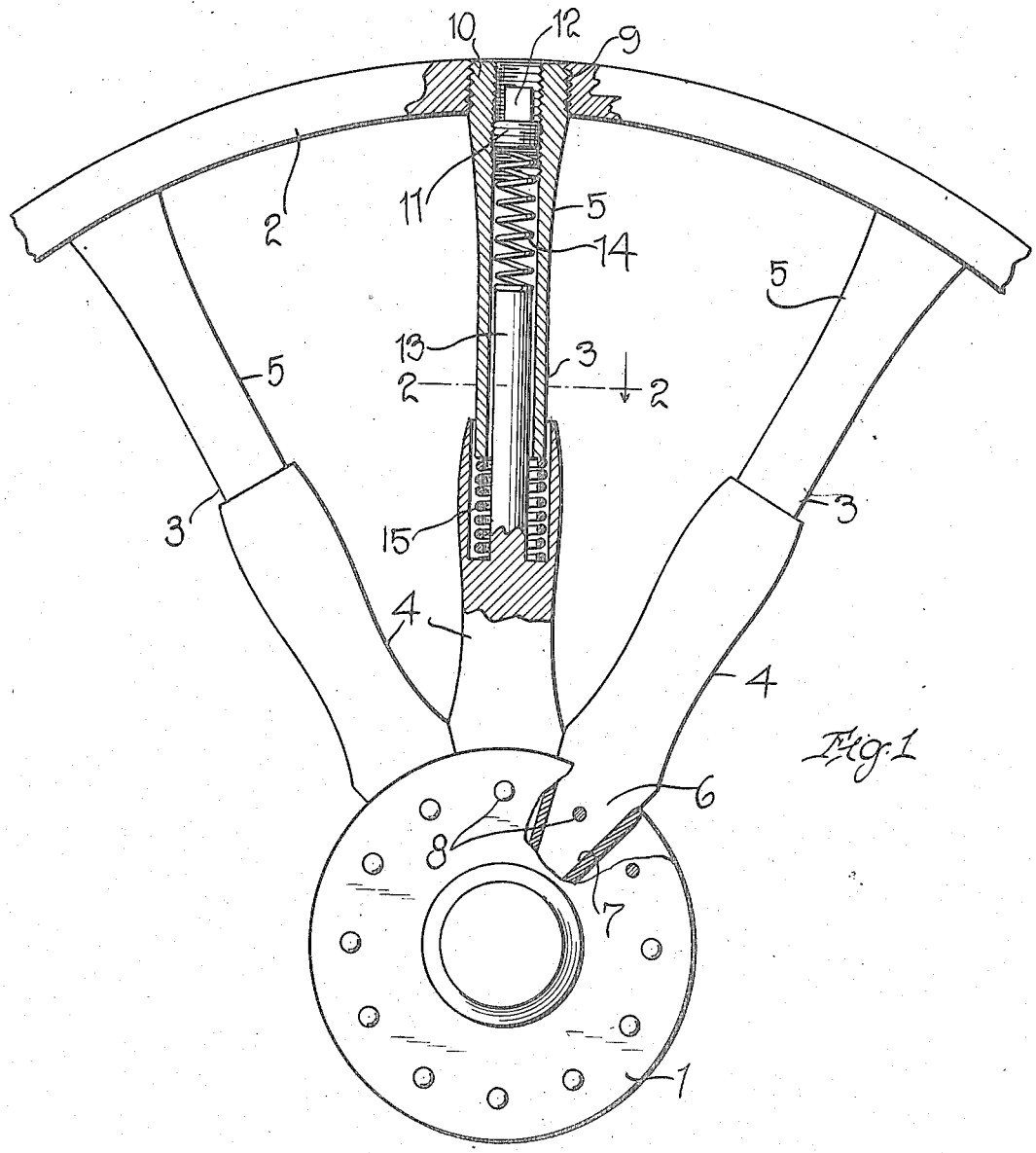
Figure 2:
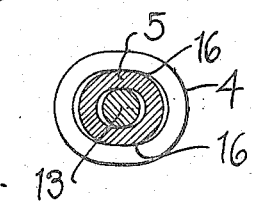

With these and other objects in view, my invention consists in the novel construction, combination, and arrangement of parts to be hereinafter more fully described, claimed, and illustrated in the accompanying drawing, in which, Figure 1 is a fragmentary side elevation of my improved resilient wheel, partly in section; and Fig. 2 is a sectional view on the line 2—2 of Fig. 1.

Referring more particularly to the drawing, the numeral 1 designates the hub, 2 the rim, and 3 my improved spring spokes which are interposed between the hub and the rim. Each of the spokes comprises an inner tubular section 4 and an outer tubular section 5, the inner end of the outer section of each spoke being reduced for telescoping engagement within the outer end of the inner section of the spoke. The inner end of the inner section of each spoke is closed, and projecting longitudinally from the closed inner end of each spoke is a reduced apertured lug 6. A plurality of elongated transversely extending recesses 7 is formed in the periphery of the hub, the recesses being adapted to receive the reduced apertured lugs of the inner sections of the spokes, and disposed through the hub and the openings in the lugs are suitable fastening devices 8 by means of which the inner sections of the spokes are secured to the hub. A plurality of threaded openings 9 is formed in the rim in radial alinement with the recesses 7 in the hub, and the outer end of each of the outer sections of the spokes is threaded as at 10, for engagement in one of the threaded openings in the rim, whereby the outer sections of the spokes are secured to the rim. The outer end of each outer section is also interiorly threaded to receive a threaded head 11 which is adapted to close the outer end of the section. Each of the heads 11 is provided with an outwardly projecting reduced angular extension 12 for engagement by a suitable tool (not shown) whereby the heads may be turned into or out of the spokes.

Projecting outwardly from the closed end of each inner section is a stem 13, the free end of the stem projecting beyond the end of the inner section for engagement within the inner end of the outer section of the spoke. Mounted within the outer section of each spoke to bear at its outer end against the head 11 is a helical spring 14, the inner end of the spring being engaged against the extremity of the stem 13, and disposed within the outer end of each inner section around the stem 13 is a similar helical spring 15, one end of the spring 15 engaging the closed end of the inner section, and the outer end of the spring 15 engaging the inner extremity of the outer section. The opposite faces of the sections of the spokes at their opposing ends, which face in the direction of the longitudinal plane of the hub, are flattened as at 16, so that when the sections are telescoped, the flattened faces engage each other to prevent transverse rocking of the rim with relation to the hub. As clearly shown in Fig. 2 of the drawing, the rounded portions of the telescoped sections are spaced from each other in a direction circumferentially of the wheel, so that the outer sections of the spokes are allowed to rock circumferentially of the wheel with relation to the hub to relieve the spokes of abnormal strain and to allow the rim to move slightly with relation to the hub, when the wheel is revolving over the ground.

In the practical use of my improved wheel, when the portion of the rim engaging the ground strikes an obstruction in the roadway, the rim will be forced upwardly toward the hub against the tension of the springs 14 and 15 so that the springs will absorb the shock ordinarily imposed upon the vehicle body (not shown). The tension of the springs 14 may be readily adjusted by turning the threaded heads 11 against which the outer ends of the springs bear, and it will be seen that should any of the springs 14 become broken, the same may be readily removed by turning the heads 11 out of the outer ends of the spokes so that new springs may be replaced therefor.

Having thus fully described my invention, what I desire to secure and claim by Letters Patent, is:—

A resilient wheel comprising a hub, a rim, spokes interposed between said hub and rim, each of the spokes comprising inner and outer tubular telescoping members, the inner ends of said inner members being closed, said rim having a plurality of threaded openings therein to threadably receive the outer ends of the outer members of the spokes, said outer members being interiorly threaded at their outer ends, heads threadably mounted in the outer ends of the outer sections, stems projecting outwardly from the inner end walls of the inner members, said stems projecting within said outer members, springs mounted within said outer members and engaged at one end against said heads and at their other end against the outer ends of said stems, and springs mounted within said inner members for engagement at one end against the inner end of the outer sections and at their other end against the inner end wall of the inner sections.

In testimony whereof I hereunto affix my signature in the presence of two witnesses.

JOHN J. SEVERIN.

Witnesses:
F. MORLEY,
CHAS. RADCLIFFE.